Figure 1:
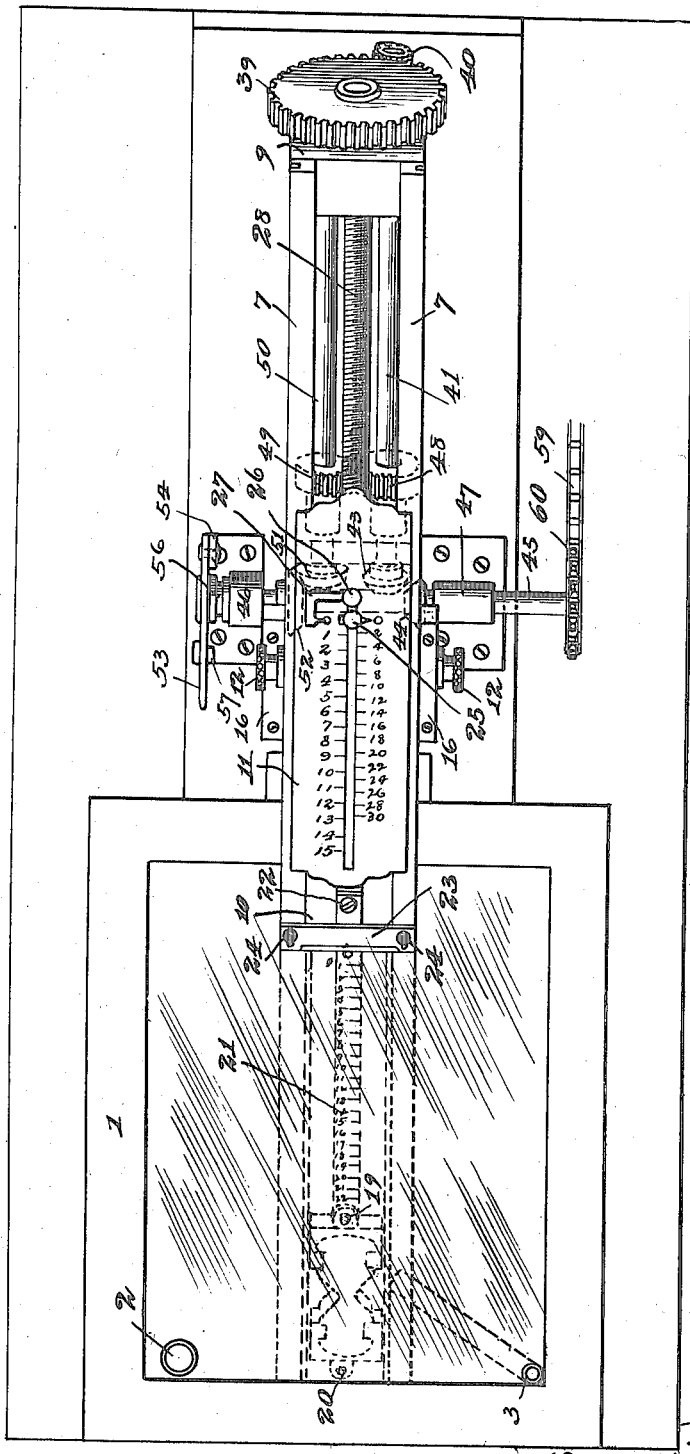

L. KIRSCHBAUN.
TESTING MACHINE.
APPLICATION FILED MAY 11, 1914.

1,180,506.

Patented Apr. 25, 1916.
3 SHEETS—SHEET 1.

Witnesses,
Inventor,
Lester Kirschbaun
By Frank L. Belknap Atty.

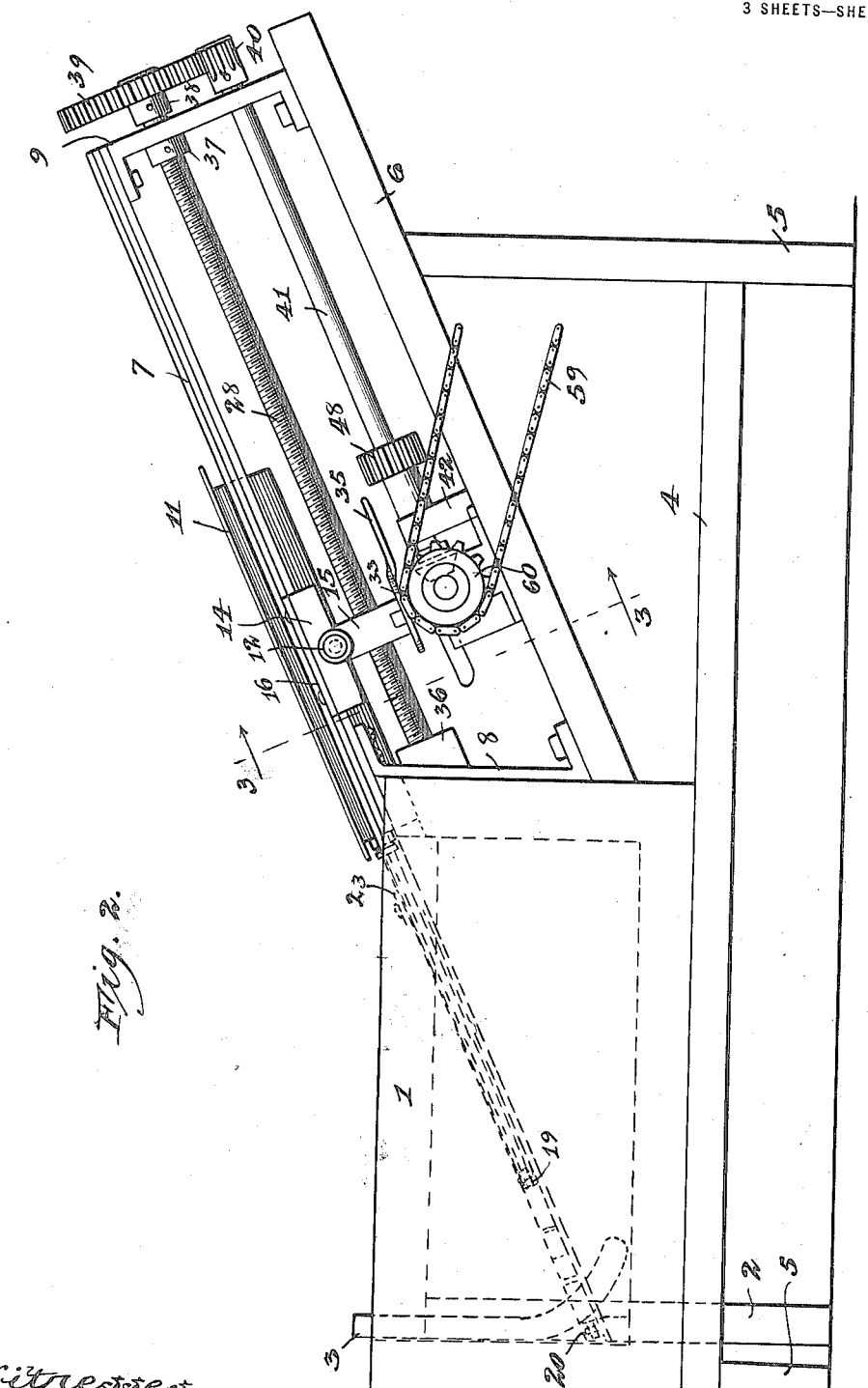

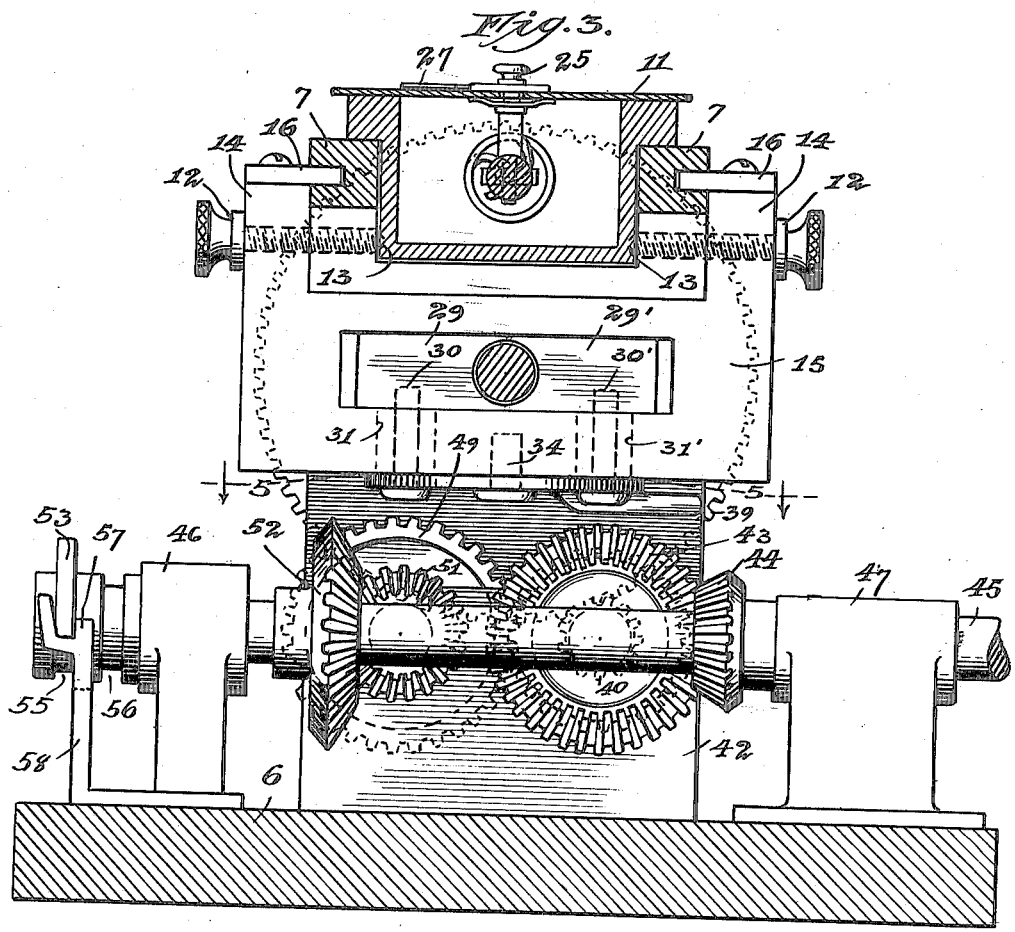
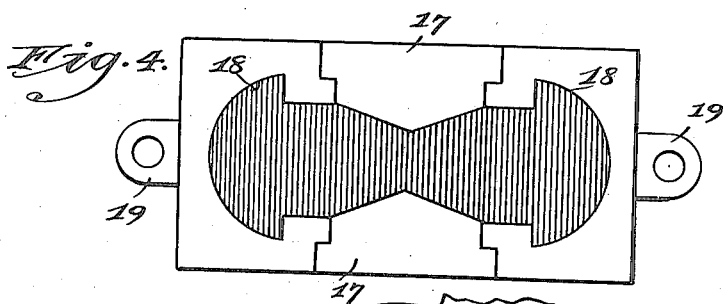
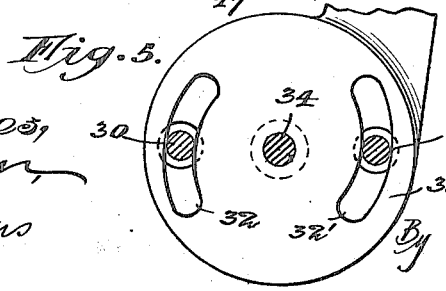

UNITED STATES PATENT OFFICE.

LESTER KIRSCHBRAUN, OF CHICAGO, ILLINOIS.

TESTING-MACHINE.

1,180,506.

Specification of Letters Patent.   Patented Apr. 25, 1916.

Application filed May 11, 1914.   Serial No. 837,708.

*To all whom it may concern:*

Be it known that I, LESTER KIRSCHBRAUN, a citizen of the United States, residing in the city of Chicago, county of Cook, and State of Illinois, have invented certain new and useful Improvements in Testing-Machines, of which the following is a specification.

This invention relates to improvements in testing machines and refers more specifically to a machine for testing or determining the cementing quality or strength of a plastic composition, such as asphalt, coal tars, and analogous bituminous products.

I have discovered that cementing strength of a plastic composition such as a bituminous binder is directly proportionate to the work done in fracturing or pulling apart a unit quantity of such product. In other words, this cementing power may be ascertained by determining the force or weight sustained in stretching such product through any given unit or units of space.

The object of the invention is to provide an apparatus which will determine the above mentioned cementing power of a product of the character referred to.

Subsidiary objects of the invention are to provide an apparatus which is adapted for testing the product at a given or predetermined temperature; further to provide an apparatus in which the product to be tested is secured at one end to a relatively fixed point and at its other end to a dynamometer traveling at a constant rate of speed away from said fixed point, and thus producing an elongation or stretching of the product being tested. Also the dynamometer registers the strain and means are provided for simultaneously determining the length or distance of elongation of the product being tested. The apparatus is so arranged that the dynamometer records the strain at every unit of elongation of the product being tested. The sum of the products of these readings, taken until fracture or return to zero, represents the work done and is directly proportionate to the cementing power of the bituminous material being tested.

The invention consists in the matters hereinafter described and more particularly pointed out in the appended claims.

In the drawings—Figure 1 is a plan view of the invention with parts shown in dotted lines. Fig. 2 is a similar side elevator of the same. Fig. 3 is a sectional view taken on lines 3—3 of Fig. 2 and looking in the direction of the arrows. Fig. 4 is a plan view showing a mold in which the briquets are formed. Fig. 5 is a horizontal sectional view taken on lines 5—5 of Fig. 3 and looking in the direction of the arrows.

Referring to the drawings—1 designates a tank for holding water, and adapted to receive briquets; the idea being to maintain the briquets at a constant temperature during the test.

2 designates the outlet for draining the contents of the tank, and 3 an air pipe for stirring the water to maintain a uniform temperature.

The tank is or may be supported on a frame work 4 and 5, although the construction and manner of supporting this tank has nothing to do with the invention. On the frame work is supported an incline 6 carrying a pair of track rods 7 which extend from the bottom of the tank to the upper end of the incline. The incline and the track rods are secured by castings 8 and 9 which form the bottom or support for the specimen to be tested. Below the track rod 7 is a glass plate 10, upon the upper end of the track is mounted a dynamometer 11, this dynamometer is supported on a traveling carriage 15 by means of a pair of set screws 12 which enter suitable recesses 13 in the dynamometer. The carriage 15 has a pair of upstanding flanges 14 carrying guide fingers 16 which ride in a grooved track member 7.

Describing now the manner of holding the specimen, the briquet is secured in a mold which in itself forms no part of the invention. The mold comprises side members 17 which are removed when the test is made, and end piece 18 having lugs or eyes 19. When the briquet is in the mold, the members 17 are removed and when the lug 19 is fastened to a pin 20 in the tank, the other lug 19 is secured to the adjacent end of a rod having a graduated scale 21. This rod in turn is connected by means of screw 22 to the dynamometer. The rod is graduated in centimeters beginning with zero. Across the track rod 7 is mounted an adjustable bridge piece 23 fastened to the rod 7 by means of screws 24. The ends of the plate receiving the screws are slotted so that the bridge piece 23 can be adjusted to the zero mark on the scale. The dynamometer is preferably graduated in pounds and kilograms, and is provided with a pointer 25 which slides in the slot and is pushed ahead by a pointer 26. The pointer 25 serves to record the maximum load to which the specimen is subjected while the active pointer 26 has an L-shaped extension 27 as shown clearly in Fig. 1. The sliding carriage is mounted upon a screw 28 through the medium of a feed-nut, preferably made in two pieces 29 and 29'. Movement of these members 29 and 29' is effected by means of a pair of pins 30 and 30' which engage the under side of the nut and slide in a pair of rectangular slots 31 and 31' in the lower part of the carriage. The lower ends of the pin 30 and 30' enter a pair of cam slots 32 and 32' in the cam member 33. This cam member is rotatably mounted upon a stub shaft 34 seated in the carriage 15. The cam member 33 is provided with a handle 35 and it will be seen that movement of the handle in one direction operates to separate the members 29 and 29' to permit the carriage to be manually drawn along the track. Movement of the handle in the opposite direction will lock the two halves of the nut into threaded engagement with the screw shaft 28. This shaft 28 rotates in bearings 37 and 38, arranged on opposite sides of the casting 9. The shaft is rotated as follows: On its upper end is secured a spur gear 39 which engages a pinion 40 carried by a counter-shaft 41, extending at one end through the casting 9 and at its other mounted on a suitable bracket 42. On the lower end of the counter shaft 41 is a beveled gear 43 meshing with bevel pinion 44 which is keyed to the cross shaft 45. This shaft 45 is mounted in a suitable bracket 46 and 47. The shaft 41 is also provided above the bracket 42 with a spur gear 48 which meshes with a gear 49, which is in turn keyed to a shaft 50 parallel with the shaft 41. On the lower end of the shaft 50 is a beveled pinion 51 which is adapted to mesh with bevel gear 52 keyed to the cross shaft 45. This cross shaft 45 slides and rotates in the bearings 46 and 47. The gears 44 and 52 are so locked upon the shaft 45 that when the latter is in a given position, the pinion 44 is in mesh with the gear 43; and if the cross shaft 45 be placed in the other longitudinal position the gears 43 and 44 are out of engagement while the gears 51 and 52 mesh. (See Fig. 3.) The cross shaft 45 is locked in position by means of a lever 53 pivoted to an upstanding lug 54 provided with a semi-circular notch fitting over the cross shaft 45, the latter being grooved out to admit the lever in its two different positions, as shown at 55 and 56. The free end of the lever 53 is supported by a fork 57 on the upper end of a lug 58.

By means of the foregoing mechanism two different gear ratios may be obtained between the cross shaft 45 and the traversing screw 28. In the position shown in Fig. 3, the cross shaft 45 is driving through the large bevel gear 52. The screw will then be rotating at a comparatively high speed. If the shaft 45 be moved longitudinally to the left, the lever 53 being first lifted out of the groove 55, and then dropped into engagement with the groove 56, the large gear 52 will be thrown out of mesh and the cross shaft will drive through the small pinion 44, thus effecting a reduction in speed. The cross shaft 45 is driven through suitable reduction gearing (not shown) by an electric motor through a chain 59 and sprocket 60 keyed to the outer end of the shaft 45. The detail manner of driving this screw is, as far as the broader aspects of the invention are concerned, not vitally important.

The operation of the apparatus should be apparent from the foregoing description. The specimen to be tested after having been formed in the briquet is secured in position in the tank, the dynamometer and scale having been previously set. As the carriage travels up the track the readings are taken on the scale, and similarly on the dynamometer, the tension on the specimen or sample being tested of course continuing until the fracture occurs or the dynamometer again registers zero. The manner of determining from these readings the cementitiousness or cementing value of the specimen being treated has heretofore been described. It is to be understood in testing harder and more brittle specimens fracture will occur upon a comparatively slight elongation at a comparatively high strain; but with the more plastic and ductile bituminous specimens the dynamometer after registering the maximum strain in elongating may have materially reduced the cross section of the specimen being tested. The result will be that the dynamometer registers decreasing strain, the specimen elongating faster than the dynamometer travels and the indicator on the dynamometer may return to zero without fracture of the specimen. This will show the cementing value of the product even though there is no fracture.

The invention is not limited to the details of construction shown except as set forth in the appended claims.

I claim as my invention:

1. In a machine for testing bituminous products, the combination with a tank for holding a fluid at constant temperature and for receiving the product to be tested, of a pair of supporting members between which the specimen to be tested while in said tank is mounted, one of said members being relatively stationary and the other member movable, means for actuating said movable member, a dynamometer interposed between said means and said movable support and adapted to register increasing and decreasing strains, and a scale mounted adjacent to the movable support for determining the units of space through which said support moves.

2. In a machine for testing bituminous products, the combination with a pair of supporting members between which a specimen to be tested is mounted, one of said members being relatively stationary and the other member movable, mechanism for actuating said movable member, a dynamometer interposed between said mechanisms and said movable support, and a scale mounted adjacent to said movable support for determining the units of space through which said support moves, and means associated with the supporting member for maintaining the specimen to be tested at a substantially constant temperature during treatment.

3. In a testing machine, the combination with a tank for holding liquid, means for maintaining said liquid at a substantially constant temperature, a pair of inclined drag rods extending into the tank, a pair of supports seated in said tank and adapted to hold a specimen to be tested, one of said supports being movable, a traveling carriage mounted on said drag rods, a dynamometer on said carriage, and connected to the movable support, the indicator of said dynamometer being free to move in either direction, and means for actuating said carriage.

LESTER KIRSCHBRAUN.

Witnesses:
JOYCE M. LUTZ,
F. L. BELKNAP.